(12) United States Patent
Ohno

(10) Patent No.: US 11,541,938 B2
(45) Date of Patent: Jan. 3, 2023

(54) VEHICLE UNIT MOUNTING SUPPORT SYSTEM AND VEHICLE

(71) Applicant: Toyota Jidosha Kabushiki Kaisha, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 17/065,859

(22) Filed: Oct. 8, 2020

(65) Prior Publication Data

US 2021/0221438 A1 Jul. 22, 2021

(30) Foreign Application Priority Data

Jan. 20, 2020 (JP) .............................. JP2020-007092

(51) Int. Cl.
| | | |
|---|---|---|
| *B62D 24/02* | (2006.01) | |
| *B62D 65/00* | (2006.01) | |
| *B60K 35/00* | (2006.01) | |
| *B60W 60/00* | (2020.01) | |

(52) U.S. Cl.
CPC .............. *B62D 24/02* (2013.01); *B60K 35/00* (2013.01); *B60W 60/00186* (2020.02); *B62D 65/00* (2013.01)

(58) Field of Classification Search
None
See application file for complete search history.

(56) References Cited

U.S. PATENT DOCUMENTS

| | | | | |
|---|---|---|---|---|
| 2004/0245033 | A1* | 12/2004 | Saeki | ..................... B62D 39/00 |
| | | | | 180/89.1 |
| 2018/0086401 | A1 | 3/2018 | Haug et al. | |
| 2020/0207419 | A1* | 7/2020 | Iwasaki | ................. B60R 16/023 |
| 2020/0369140 | A1* | 11/2020 | McCarron | ................ B60K 1/00 |

FOREIGN PATENT DOCUMENTS

| | | |
|---|---|---|
| CN | 103552527 A | 2/2014 |
| CN | 103569203 A | 2/2014 |
| DE | 102019002569 A1 * | 10/2019 |
| JP | S61191477 | 8/1986 |
| JP | 2018-516203 | 6/2018 |

OTHER PUBLICATIONS

Gottwald, Espacenet translation of DE-102019002569-A1, 2019 (Year: 2019).*

* cited by examiner

*Primary Examiner* — James J Lee
*Assistant Examiner* — Andrew Sang Kim
(74) *Attorney, Agent, or Firm* — Dinsmore & Shohl LLP

(57) ABSTRACT

A CPU of a control device provided in a traveling unit causes a display to display information indicating that it is necessary to mount an energy absorbing unit capable of absorbing collision energy in a case where it is determined that a vehicle cabin forming unit is for the purpose of carrying a person, and causes the display to display information indicating that it is not necessary to mount the energy absorbing unit in a case where it is determined that the vehicle cabin forming unit is not for the purpose of carrying a person.

20 Claims, 9 Drawing Sheets

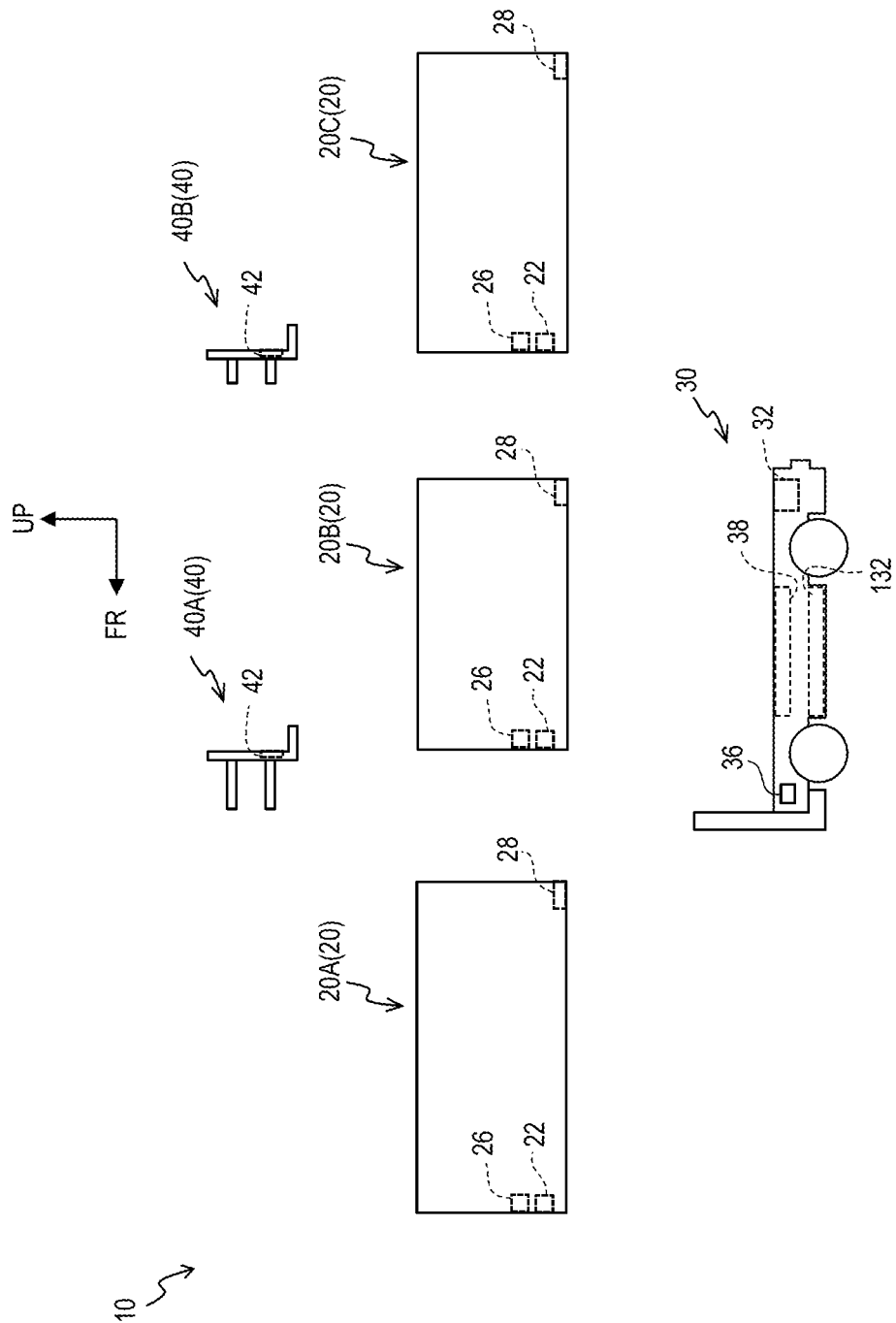

VEHICLE UNIT MOUNTING SUPPORT SYSTEM AND VEHICLE

CROSS-REFERENCE TO RELATED APPLICATION

This application claims priority to Japanese Patent Application No. 2020-007092 filed on Jan. 20, 2020, incorporated herein by reference in its entirety.

BACKGROUND

1. Technical Field

The present disclosure relates to a vehicle unit mounting support system and a vehicle.

2. Description of Related Art

It is well-known that a vehicle may be formed by combining several units including a unit forming a vehicle cabin (vehicle cabin forming unit) and a unit with a traveling drive source causing the vehicle to travel (traveling unit) (see, for example, Japanese Unexamined Patent Application Publication No. 2018-516203 and Japanese Unexamined Patent Application Publication No. 61-191477).

SUMMARY

However, since the related art described above is not related to technology for dealing with a collision, the vehicle can be further improved so as to meet the demand for dealing with a collision while also enhancing convenience when mounting a unit arranged above the traveling unit.

The present disclosure is intended to provide a vehicle unit mounting support system and a vehicle, respectively capable of meeting the demand for dealing with a collision while also enhancing convenience when mounting a unit arranged above a traveling unit, while considering above requirements.

A vehicle unit mounting support system according to a first aspect is a vehicle unit mounting support system that supports mounting of a unit on a traveling unit in a vehicle capable of autonomous driving. The vehicle includes a vehicle cabin forming unit that forms a cabin of the vehicle, and the traveling unit that causes the vehicle to travel and includes at least the vehicle cabin forming unit on an upper surface side and a traveling drive source. The vehicle unit mounting support system includes an identification unit provided in the vehicle cabin forming unit and configured to indicate identification information on whether the vehicle cabin forming unit is for the purpose of carrying a person, a determination unit provided in the traveling unit and configured to determine the identification information indicated by the identification unit in a state where the vehicle cabin forming unit is mounted on the upper surface side of the traveling unit, a display unit provided in the traveling unit and configured to display information, and a display control unit provided in the traveling unit, and configured to cause, in a case where the determination unit determines that the vehicle cabin forming unit is for the purpose of carrying a person, the display unit to display information indicating that it is necessary to mount an energy absorbing unit configured to absorb collision energy, and to cause, in a case where the determination unit determines that the vehicle cabin forming unit is not for the purpose of carrying a person, the display unit to display information indicating that it is not necessary to mount the energy absorbing unit.

With the above configuration, the identification unit provided in the vehicle cabin forming unit indicates the identification information on whether the vehicle cabin forming unit is for the purpose of carrying a person. Meanwhile, the determination unit provided in the traveling unit determines the identification information indicated by the identification unit in a state where the vehicle cabin forming unit is mounted on the upper surface side of the traveling unit. Further, the traveling unit is provided with the display unit and the display control unit. The display control unit causes, in a case where the determination unit determines that the vehicle cabin forming unit is for the purpose of carrying a person, the display unit to display the information indicating that it is necessary to mount the energy absorbing unit capable of absorbing collision energy, and causes, in a case where the determination unit determines that the vehicle cabin forming unit is not for the purpose of carrying a person, the display unit to display the information indicating that it is not necessary to mount the energy absorbing unit. Consequently, a worker can easily determine whether the energy absorbing unit is required.

In the first aspect, in the vehicle unit mounting support system, the traveling unit may be provided with a mass measuring unit configured to measure a mass of a mounted object including the vehicle cabin forming unit mounted on the upper surface side of the traveling unit. The display control unit may further select, in a case where the determination unit determined that the vehicle cabin forming unit is for the purpose of carrying a person, as the energy absorbing unit to be mounted, an energy absorbing unit that has a higher deformation load as the mass measured by the mass measuring unit increases and cause the display unit to display information on the selected energy absorbing unit.

The "energy absorbing unit to be mounted" may be a single energy absorbing unit or a plurality of energy absorbing units.

With the above configuration, the mass measuring unit provided in the traveling unit measures the mass of the mounted object including the vehicle cabin forming unit mounted on the upper surface side of the traveling unit. The display control unit selects, in a case where the determination unit determined that the vehicle cabin forming unit is for the purpose of carrying a person, as the energy absorbing unit to be mounted, an energy absorbing unit that has a higher deformation load, as the mass measured by the mass measuring unit increases, and causes the display unit to display information on the selected energy absorbing unit. Therefore, a worker can easily select a suitable energy absorbing unit according to the mass of the mounted object.

In the first aspect, the vehicle unit mounting support system may include a stroke information unit provided in the energy absorbing unit and configured to have crash stroke information set in the energy absorbing unit, a reading unit provided in the vehicle cabin forming unit or the traveling unit and configured to read the crash stroke information included in the stroke information unit in a case where the energy absorbing unit is mounted on the upper surface side of the traveling unit, an upper limit vehicle speed setting unit provided in the vehicle cabin forming unit or the traveling unit and configured to set an upper limit speed of the vehicle such that the upper limit speed increases as a crash stroke is longer based on the information read by the reading unit, and a vehicle speed limiting unit provided in the traveling unit and configured to limit a speed of the vehicle such that the speed does not exceed the upper limit speed set by the upper limit vehicle speed setting unit.

With the above configuration, the stroke information unit provided in the energy absorbing unit has the crash stroke information (crash stroke is an amount that can be plastically deformed in a collision direction upon the occurrence of a collision) set in the energy absorbing unit. Meanwhile, the reading unit provided in the vehicle cabin forming unit or the traveling unit reads the crash stroke information included in the stroke information unit in a case where the energy absorbing unit is mounted on the upper surface side of the traveling unit. Further, the upper limit vehicle speed setting unit provided in the vehicle cabin forming unit or the traveling unit sets the upper limit vehicle speed of the vehicle such that the upper limit vehicle speed increases as the crash stroke is longer based on the information read by the reading unit. Moreover, the vehicle speed limiting unit provided in the traveling unit limits the speed of the vehicle such that the speed does not exceed the upper limit speed set by the upper limit vehicle speed setting unit. Consequently, it is possible to further protect occupants of the vehicle upon collision, for example, without separately calculating the upper limit vehicle speed according to the crash stroke of the energy absorbing unit and without manually setting the calculated upper limit vehicle speed when the unit is mounted.

In the first aspect, the vehicle cabin forming unit or the traveling unit may be provided with a mounting detection unit configured to detect mounting of the energy absorbing unit on the upper surface side of the traveling unit. The vehicle speed limiting unit may further control the traveling unit such that the traveling unit does not travel or travels at a predetermined low speed or slower, in a case where the determination unit determined that the vehicle cabin forming unit is for the purpose of carrying a person and the mounting detection unit does not detect mounting of the energy absorbing unit on the upper surface side of the traveling unit.

With the above configuration, the mounting detection unit provided in the vehicle cabin forming unit or the traveling unit detects mounting of the energy absorbing unit on the upper surface side of the traveling unit. The vehicle speed limiting unit further controls the traveling unit such that the traveling unit does not travel or travels at a predetermined low speed or slower, in a case where the determination unit determined that the vehicle cabin forming unit is for the purpose of carrying a person and it is not detected by the mounting detection unit that the energy absorbing unit is mounted on the upper surface side of the traveling unit. Therefore, impact on an occupant side due to a collision of the vehicle is prevented or reduced.

In the first aspect, the vehicle unit mounting support system may include a mounting detection unit provided in the vehicle cabin forming unit or the traveling unit and configured to detect mounting the energy absorbing unit on the upper surface side of the traveling unit, and a vehicle speed limiting unit provided in the traveling unit and configured to control the traveling unit such that the traveling unit does not travel or travels at a predetermined low speed or slower, in a case where the determination unit determines that the vehicle cabin forming unit is for the purpose of carrying a person and the mounting detection unit does not detect mounting of the energy absorbing unit on the upper surface side of the traveling unit.

With the above configuration, the impact on the occupant side due to a collision of the vehicle is prevented or reduced.

In the first aspect, the vehicle unit mounting support system may include a route determination unit provided in the vehicle cabin forming unit or the traveling unit and configured to determine a travel route of the traveling unit according to the upper limit speed set by the upper limit vehicle speed setting unit, and a route traveling control unit provided in the traveling unit and configured to control the traveling unit such that the traveling unit travels along the travel route determined by the route determination unit.

With the above configuration, the route determination unit provided in the vehicle cabin forming unit or the traveling unit determines the travel route of the traveling unit according to the upper limit vehicle speed set by the upper limit vehicle speed setting unit. Moreover, the route traveling control unit provided in the traveling unit controls the traveling unit such that the traveling unit travels along the travel route determined by the route determination unit. Accordingly, the vehicle can travel along the travel route according to the upper limit vehicle speed and the crash stroke of the energy absorbing unit.

In the first aspect, the route determination unit may determine the travel route of the traveling unit such that the travel route does not include a highway in a case where it is determined that the crash stroke is less than a predetermined value based on the information read by the reading unit.

With the above configuration, the vehicle has no chance to collide with other vehicles on the highway, thus it is possible for the energy absorbing unit to favorably absorb the collision energy even if the crash stroke is less than the predetermined value.

In the first aspect, the route determination unit may determine the travel route of the traveling unit such that the travel route does not include, as much as possible, a road without a median strip and with a speed limit that is equal to or greater than a preset value in the travel route of the traveling unit, in a case where it is determined that the crash stroke is less than a predetermined value based on the information read by the reading unit. Moreover, the "predetermined value" of "less than the predetermined value" may be the same as or different from the "predetermined value" of "less than a predetermined value".

With the above configuration, the vehicle is less likely to have a head-on collision with an oncoming vehicle at high speed, thus it is possible for the energy absorbing unit to favorably absorb the collision energy even if the crash stroke is less than the predetermined value.

A vehicle according to a second aspect is a vehicle capable of autonomous driving, including a traveling unit including a traveling drive source and configured to cause the vehicle to travel, a vehicle cabin forming unit mounted on an upper surface side of the traveling unit and configured to form a cabin of the vehicle, and an energy absorbing unit mounted on the upper surface side of the traveling unit and detachably attached to the vehicle cabin forming unit or the traveling unit, and configured to absorb collision energy.

With the above configuration, the vehicle cabin forming unit is mounted on the upper surface side of the traveling unit. The energy absorbing unit capable of absorbing the collision energy is mounted on the upper surface side of the traveling unit, and is configured to be detachably attached to the vehicle cabin forming unit or the traveling unit. Consequently, it is possible to meet the demand for dealing with a collision while also the energy absorbing unit can easily be mounted on the upper surface side of the traveling unit. Further, the energy absorbing unit can be removed when no one is on the vehicle cabin forming unit.

In the second aspect, the vehicle may include a stroke information unit provided in the energy absorbing unit and configured to have crash stroke information set in the energy absorbing unit, a reading unit provided in the vehicle cabin forming unit or the traveling unit and configured to read the crash stroke information included in the stroke information unit in a case where the energy absorbing unit is mounted on the upper surface side of the traveling unit, an upper limit vehicle speed setting unit provided in the vehicle cabin forming unit or the traveling unit, and configured to set an upper limit speed of the vehicle such that the upper limit speed increases as a crash stroke is longer based on the information read by the reading unit, and a vehicle speed limiting unit provided in the traveling unit and configured to limit a speed of the vehicle such that the speed does not exceed the upper limit speed set by the upper limit vehicle speed setting unit.

With the above configuration, it is possible to further protect occupants upon the occurrence of a collision, for example, without separately calculating the upper limit vehicle speed according to the crash stroke of the energy absorbing unit and without manually setting the calculated upper limit vehicle speed when the unit is mounted.

In the second aspect, the vehicle may include a route determination unit provided in the vehicle cabin forming unit or the traveling unit and configured to determine a travel route of the traveling unit according to the upper limit speed set by the upper limit vehicle speed setting unit, and a route traveling control unit provided in the traveling unit and configured to control the traveling unit such that the traveling unit travels along the travel route determined by the route determination unit.

With the above configuration, the vehicle can travel along the travel route according to the upper limit vehicle speed and the crash stroke of the energy absorbing unit.

In the second aspect, the route determination unit may determine the travel route of the traveling unit such that the travel route does not include a highway in a case where it is determined that the crash stroke is less than a predetermined value based on the information read by the reading unit.

With the above configuration, the vehicle has no chance to collide with other vehicles on the highway, thus it is possible for the energy absorbing unit to favorably absorb the collision energy even if the crash stroke is less than the predetermined value.

In the second aspect, the route determination unit may determine the travel route of the traveling unit such that the travel route does not include, as much as possible, a road without a median strip and with a speed limit that is equal to or greater than a preset value, in a case where it is determined that the crash stroke is less than a predetermined value based on the information read by the reading unit. Moreover, the "predetermined value" of "less than the predetermined value" may be the same as or different from the "predetermined value" of "less than a predetermined value".

With the above configuration, the vehicle is less likely to have a head-on collision with an oncoming vehicle at high speed, thus it is possible to for the energy absorbing unit to favorably absorb the collision energy even if the crash stroke is less than the predetermined value.

As described above, the present disclosure has an advantageous effect in that it is possible to meet the demand for dealing with a collision while also enhancing convenience when mounting the unit arranged above the traveling unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram showing a schematic configuration of a vehicle unit mounting support system according to an embodiment;

DETAILED DESCRIPTION OF EMBODIMENTS

Figure 2A:
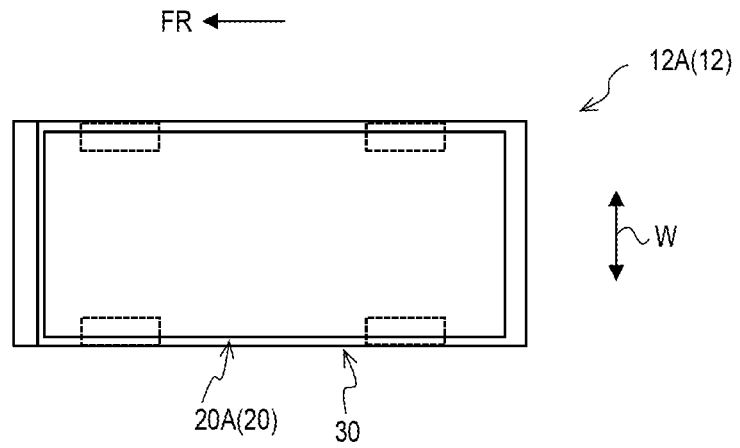
FIG. 2A is a schematic plan view of a vehicle that is not for the purpose of carrying a person.

The vehicle unit mounting support system and the vehicle according to one embodiment of the present disclosure will be described hereinbelow with reference to FIGS. 1 to 14. In these figures, an arrow FR indicates a vehicle front side, an arrow UP indicates a vehicle upper side, and an arrow W indicates a vehicle width direction.

FIG. 1 is a diagram showing a schematic configuration of a vehicle unit mounting support system according to the present embodiment, in which each component is schematically shown. As shown in FIG. 1, a vehicle unit mounting support system 10 is a vehicle unit mounting support system used in a vehicle 12 capable of autonomous driving (see FIGS. 2A to 4B). The vehicle 12 is configured to include a vehicle cabin forming unit 20A, 20B or 20C, which forms a vehicle cabin, and a traveling unit 30 which has at least the vehicle cabin forming unit 20A, 20B or 20C on an upper surface side and includes a traveling drive source 132 causing the vehicle to travel. The vehicle unit mounting support system 10 supports a unit to be mounted on the traveling unit 30 in the vehicle 12.

Since the vehicle capable of autonomous driving can be implemented by using well-known technologies, detailed descriptions thereof will be omitted. Further, FIG. 1 shows a plurality of the vehicle cabin forming units 20A, 20B, 20C, but any one of them may be mounted on the upper surface side of the traveling unit 30. Further, for convenience of description, the vehicle cabin forming units 20A, 20B, 20C are denoted by adding letters to reference numerals so as to represent different kinds of the vehicle cabin forming unit, however, otherwise the term vehicle cabin forming unit 20 is used when the distinguishable description is not required.

Energy absorbing units (hereinafter, also referred to as "EA units") 40A, 40B, respectively capable of absorbing collision energy, may be mounted on an upper surface side of the traveling unit 30. Although a plurality of the energy absorbing units 40A, 40B is shown in FIG. 1, in a case where the energy absorbing units 40A, 40B are mounted, any one of them may be mounted on the upper surface side of the traveling unit 30. Further, for convenience of description, the energy absorbing units 40A, 40B are denoted by adding letters to reference numerals so as to represent different kinds of the energy absorbing unit, however, otherwise the term energy absorbing unit 40 is used when the distinguishable description is not required.

Figure 2B:
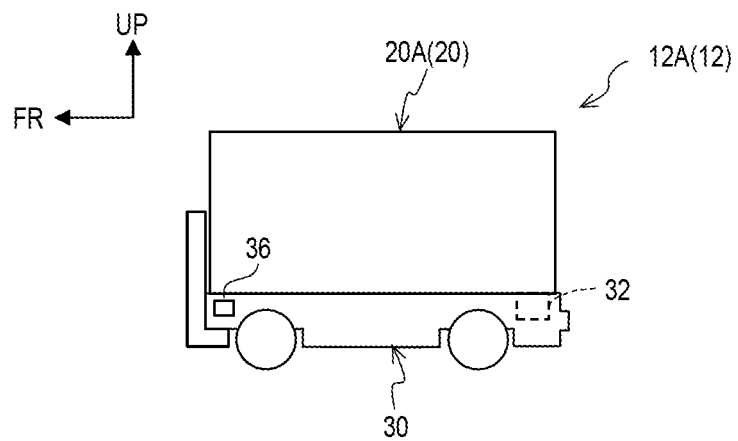
FIG. 2B is a schematic side view of the vehicle of FIG. 2A.
Figure 3A:
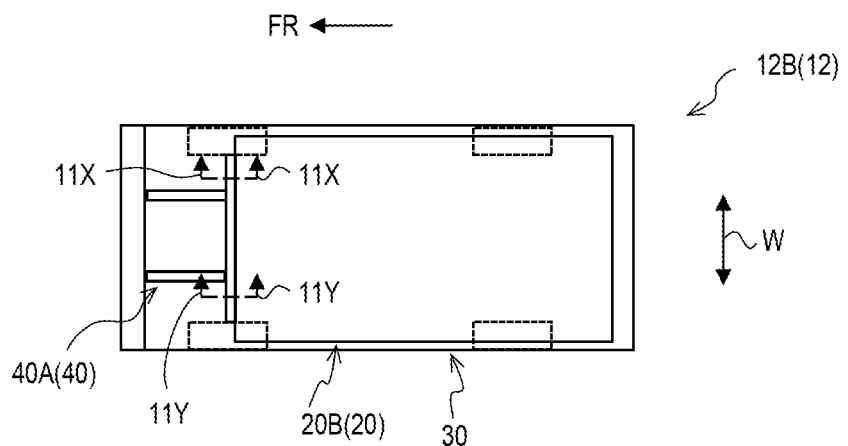
FIG. 3A is a schematic plan view of a vehicle that is for the purpose of carrying a person and has a crash stroke set to be long.
Figure 3B:
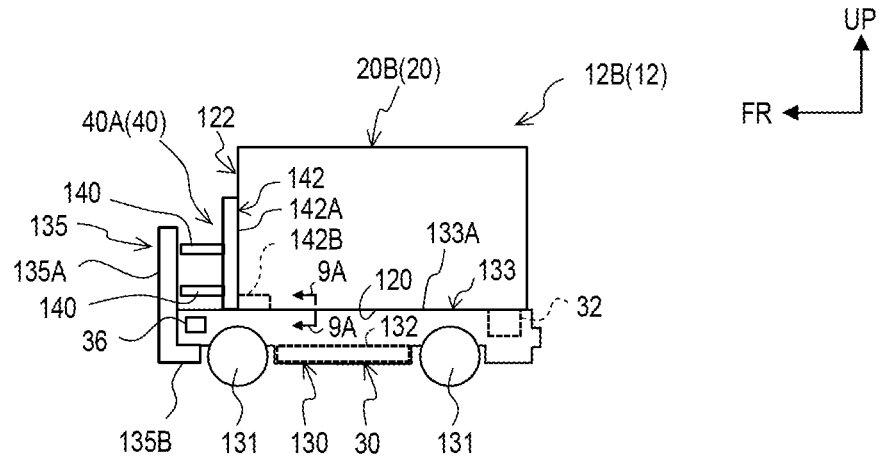
FIG. 3B is a schematic side view of the vehicle of FIG. 3A.
Figure 4A:
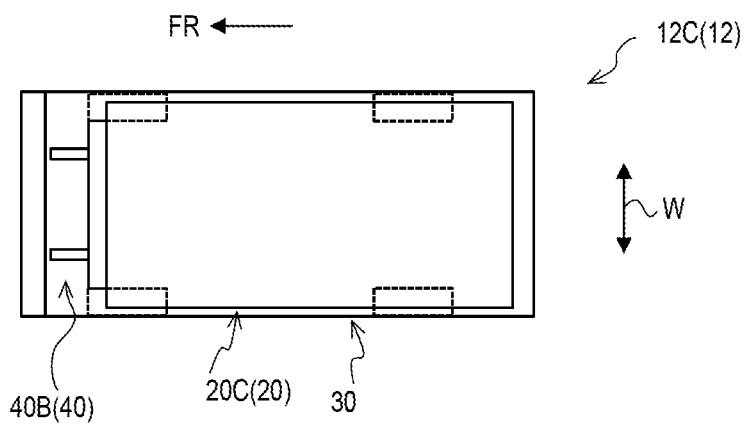
FIG. 4A is a schematic plan view of a vehicle that is for the purpose of carrying a person and has a crash stroke set to be short.
Figure 4B:
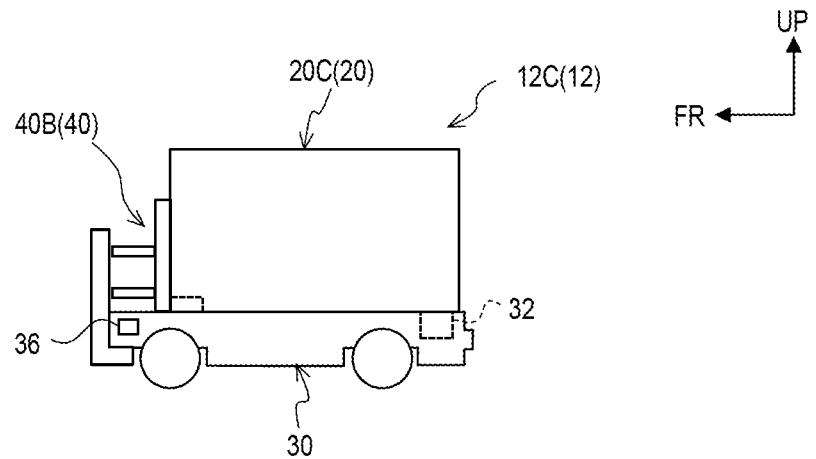
FIG. 4B is a schematic side view of the vehicle of FIG. 4A.

A vehicle 12A configured by mounting the vehicle cabin forming unit 20A on the traveling unit 30 of FIG. 1 is shown in FIGS. 2A and 2B. A vehicle 12B configured by mounting the vehicle cabin forming unit 20B and the energy absorbing unit 40A on the traveling unit 30 of FIG. 1 is shown in FIGS. 3A and 3B. Further, a vehicle 12C configured by mounting the vehicle cabin forming unit 20C and the energy absorbing unit 40B on the traveling unit 30 of FIG. 1 is shown in FIGS. 4A and 4B. Moreover, for convenience of description, the vehicles 12A, 12B and 12C are denoted by adding letters to reference numerals so as to represent different kinds of the vehicle cabin forming unit, however, otherwise the term vehicle 12 is used when the distinguishable description is not required.

Supplementary descriptions of the vehicles 12A, 12B, 12C will be given hereinbelow. The vehicle 12A shown in FIGS. 2A and 2B is a vehicle that carries only objects and not people, and has a larger vehicle cabin forming unit 20A because the energy absorbing unit 40 is not mounted. Therefore, the vehicle 12A can carry a large amount of cargo or a large size cargo. The vehicle 12B shown in FIGS. 3A and 3B and the vehicle 12C shown in FIGS. 4A and 4B are vehicles that are for the purpose of carrying a person, on which the energy absorbing unit 40 is mounted, whereby it is possible to protect occupants by mitigating the impact on the vehicle cabin forming unit 20 when the vehicle collides with other vehicles. The vehicle 12C shown in FIGS. 4A and 4B has a shorter crash stroke of the energy absorbing unit 40 but a larger cabin space than that of the vehicle 12B shown in FIGS. 3A and 3B.

Returning to FIG. 1, the vehicle cabin forming unit 20 has an identification unit 28 which indicates the identification information on whether the vehicle cabin forming unit 20 is for the purpose of carrying a person. The identification unit 28 is installed at a predetermined position on a lower surface of the vehicle cabin forming unit 20, and is configured by, for example, an IC tag (a barcode as another example). The vehicle cabin forming unit 20 includes a control device 22 and a mounting detection sensor 26 as a mounting detection unit. A front surface of the control device 22 is installed at a predetermined position on a front surface of the vehicle cabin forming unit 20. The mounting detection sensor 26 detects that the energy absorbing unit 40 is mounted on an upper surface side of the traveling unit 30. The traveling unit 30 includes a control device 32 as a computer, a display 36 as a display unit, and a mass measuring device 38 as a mass measuring unit. An upper surface of the control device 32 is installed at an upper surface of the traveling unit 30. The identification unit 28 of the vehicle cabin forming unit 20, described above, is installed at a position corresponding to a predetermined position on the upper surface of the control device 32 in the vehicle cabin forming unit 20. The display 36 displays predetermined information. The mass measuring device 38 measures the mass of a mounted object including the vehicle cabin forming unit 20 mounted on the upper surface side of the traveling unit 30. The energy absorbing unit 40 is provided with a stroke information unit 42 having crash stroke information set in the energy absorbing unit 40. In the present embodiment, the stroke information unit 42 is installed at a position corresponding to a predetermined position on the front surface of the control device 22 in the energy absorbing unit 40, and is configured by, for example, the IC tag (a barcode as another example).

Figure 5A:
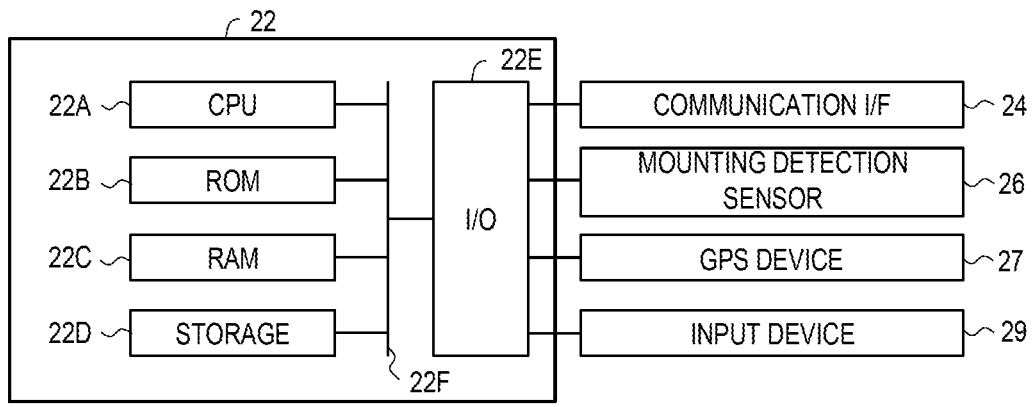
FIG. 5A is a block diagram showing one example of a hardware configuration of a control device of a vehicle cabin forming unit.

FIG. 5A is a block diagram showing one example of a hardware configuration of the control device 22 of the vehicle cabin forming unit 20. As shown in FIG. 5A, the control device 22 has a CPU 22A, a ROM 22B, a RAM 22C, a storage 22D, and an input/output interface (I/O) 22E. These components are connected via a bus 22F so as to communicate with each other. A communication interface (communication I/F) 24, the mounting detection sensor 26, a GPS device 27, and an input device 29 are connected to the I/O 22E. The GPS device 27 acquires its own location information, and the input device 29 is a device that inputs information such as a destination. Although not shown, various sensors that detect peripheral information are also connected to the I/O 22E.

Figure 5B:
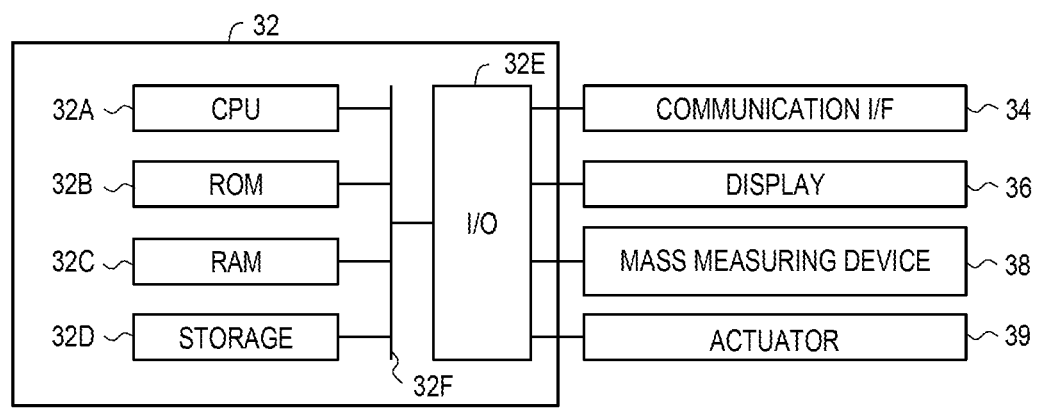
FIG. 5B is a block diagram showing one example of a hardware configuration of a control device of a traveling unit.

FIG. 5B is a block diagram showing one example of a hardware configuration of the control device 32 of the traveling unit 30. As shown in FIG. 5B, the control device 32 has a CPU 32A, a ROM 32B, a RAM 32C, a storage 32D, and an I/O 32E. These components are connected via a bus 32F so as to communicate with each other. A communication OF 34, the display 36, the mass measuring device 38, and an actuator 39 are connected to the I/O 32E. The actuator 39 includes a steering wheel actuator that drives a steering wheel of the vehicle 12, an accelerator actuator that controls acceleration of the vehicle 12, and a brake actuator that controls deceleration of the vehicle 12.

The CPU 22A or 32A, shown in FIGS. 5A and 5B, is a central processing unit that executes various programs and controls each unit. In the control device 22 shown in FIG. 5A, the CPU 22A reads the program from the ROM 22B or the storage 22D and executes the program using the RAM 22C as a work area. In the present embodiment, the ROM 22B or the storage 22D stores a program for an upper limit vehicle speed/travel route setting process. Moreover, in the control device 32 shown in FIG. 5B, the CPU 32A reads the program from the ROM 32B or the storage 32D and executes the program using the RAM 32C as a work area. In the present embodiment, the ROM 32B or the storage 32D stores a vehicle unit mounting support program, a vehicle speed limiting processing program, and a route traveling control processing program.

The ROMs 22B or 32B, shown in FIGS. 5A and 5B, store various programs and various data. The RAM 22C or 32C temporarily stores a program or data as a work area. The storage 22D or 32D is configured by a hard disk drive (HDD) or a solid state drive (SSD), which stores various programs including an operating system and various data. Map data is stored in the storage 22D shown in FIG. 5A. The communication OF 24, shown in FIG. 5A, is an interface for the control device 22 to communicate with other devices, and the communication OF 24, shown in FIG. 5B, is an interface for the control device 32 to communicate with other devices.

When executing the program stored in the ROM 22B or the storage 22D shown in FIG. 5A, the control device 22 implements various functions by using the hardware resources shown in FIG. 5A. The functional configuration implemented by the control device 22 will be described.

Figure 6A:
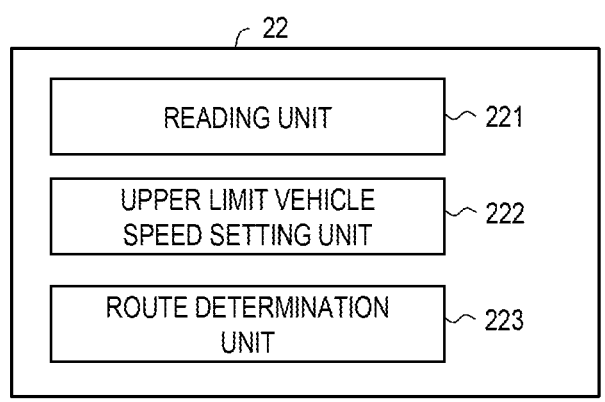
FIG. 6A is a block diagram showing one example of a functional configuration of the control device of the vehicle cabin forming unit.

FIG. 6A is a block diagram showing one example of a functional configuration of the control device 22. As shown in FIG. 6A, the control device 22 has a reading unit 221, an upper limit vehicle speed setting unit 222, and a route determination unit 223 as functional configurations.

The reading unit 221 reads the crash stroke information included in the stroke information unit 42 in a case where the energy absorbing unit 40 is mounted on the upper surface side of the traveling unit 30. The upper limit vehicle speed setting unit 222 sets the upper limit vehicle speed such that the upper limit vehicle speed increases as the crash stroke is longer based on the information read by the reading unit 221.

The route determination unit 223 determines the travel route of the traveling unit 30 according to the upper limit vehicle speed set by the upper limit vehicle speed setting unit 222. The route determination unit 223 determines the travel route of the traveling unit 30 such that it does not include a highway in a case where it is determined that the crash stroke is shorter than a predetermined value based on the information read by the reading unit 221.

Moreover, the route determination unit 223 determines the travel route of the traveling unit 30 such that it does not include, as much as possible, a road without a median strip and with a speed limit that is equal to or greater than a preset value (for example, 60 km/h), in a case where it is determined that the crash stroke is less than the predetermined value based on the information read by the reading unit 221. Supplementary descriptions of such a determination will be given. In a case where a route to reach the destination includes routes that do not pass through "a road without a median strip and with a speed limit that is equal to or greater than a preset value", the route determination unit 223 determines one of such routes as the travel route of the traveling unit 30. Additionally, in a case where passing through "a road without a median strip and with a speed limit that is equal to or greater than a preset value" to reach the destination is unavoidable, the route determination unit 223 determines a route passing through "a road without a median strip and with a speed limit that is equal to or greater than a preset value" within a minimum required range as the travel route of the traveling unit 30.

Meanwhile, when executing the program stored in the ROM 32B or the storage 32D shown in FIG. 5B, the control device 32 implements various functions by using the hardware resources shown in FIG. 5B. The functional configuration implemented by the control device 32 will be described.

Figure 6B:
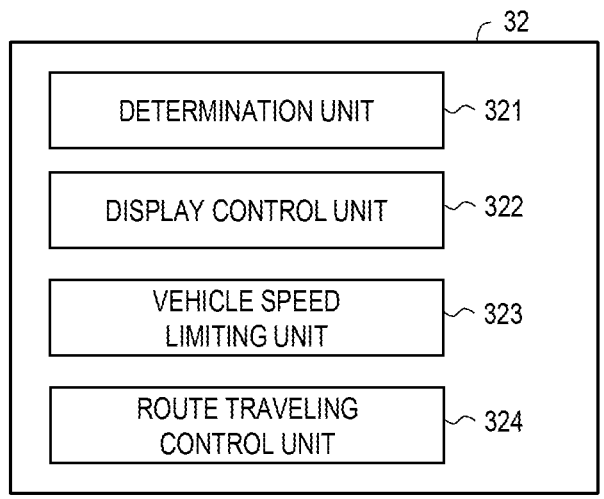
FIG. 6B is a block diagram showing one example of a functional configuration of the control device of the traveling unit.

FIG. 6B is a block diagram showing one example of a functional configuration of the control device 32. As shown in FIG. 6B, the control device 32 has a determination unit 321, a display control unit 322, a vehicle speed limiting unit 323, and a route traveling control unit 324 as functional configurations.

The determination unit 321 determines the identification information indicated by the identification unit 28 of the vehicle cabin forming unit 20 in a state where the vehicle cabin forming unit 20 is mounted on the upper surface side of the traveling unit 30. The display control unit 322 causes the display 36 to display the information indicating that it is necessary to mount the energy absorbing unit 40 capable of absorbing collision energy in a case where the determination unit 321 determined that the vehicle cabin forming unit 20 is for the purpose of carrying a person, and causes the display 36 to display the information indicating that the energy absorbing unit 40 is not required in a case where the determination unit 321 determined that the vehicle cabin forming unit 20 is not for the purpose of carrying a person.

The display control unit 322 further selects the energy absorbing unit 40 having a higher deformation load as the energy absorbing unit 40 to be mounted, as the mass measured by the mass measuring device 38 increases, in a case where the determination unit 321 determined that the vehicle cabin forming unit 20 is for the purpose of carrying a person, and causes the display 36 to display information on the selected energy absorbing unit 40.

The vehicle speed limiting unit 323 limits the vehicle speed such that the speed does not exceed the upper limit vehicle speed set by the upper limit vehicle speed setting unit 222. The vehicle speed limiting unit 323 further controls the traveling unit 30 such that the traveling unit does not travel, in a case where the determination unit 321 determined that the vehicle cabin forming unit 20 is for the purpose of carrying a person and it is not detected by the mounting detection sensor 26 that the energy absorbing unit 40 is mounted on the upper surface side of the traveling unit 30. As a modified example, the vehicle speed limiting unit 323 further controls the traveling unit 30 such that the traveling unit 30 travels at a predetermined low speed (for example, 20 km/h) or slower, in a case where the determination unit 321 determined that the vehicle cabin forming unit 20 is for the purpose of carrying a person and it is not detected by the mounting detection sensor 26 that the energy absorbing unit 40 is mounted on the upper surface side of the traveling unit 30. Moreover, the route traveling control unit 324 controls the traveling unit 30 such that the traveling unit 30 travels along the travel route determined by the route determination unit 223.

Next, operations of the control device 32 of the traveling unit 30 and the control device 22 of the vehicle cabin forming unit 20 will be described.

Figure 7:
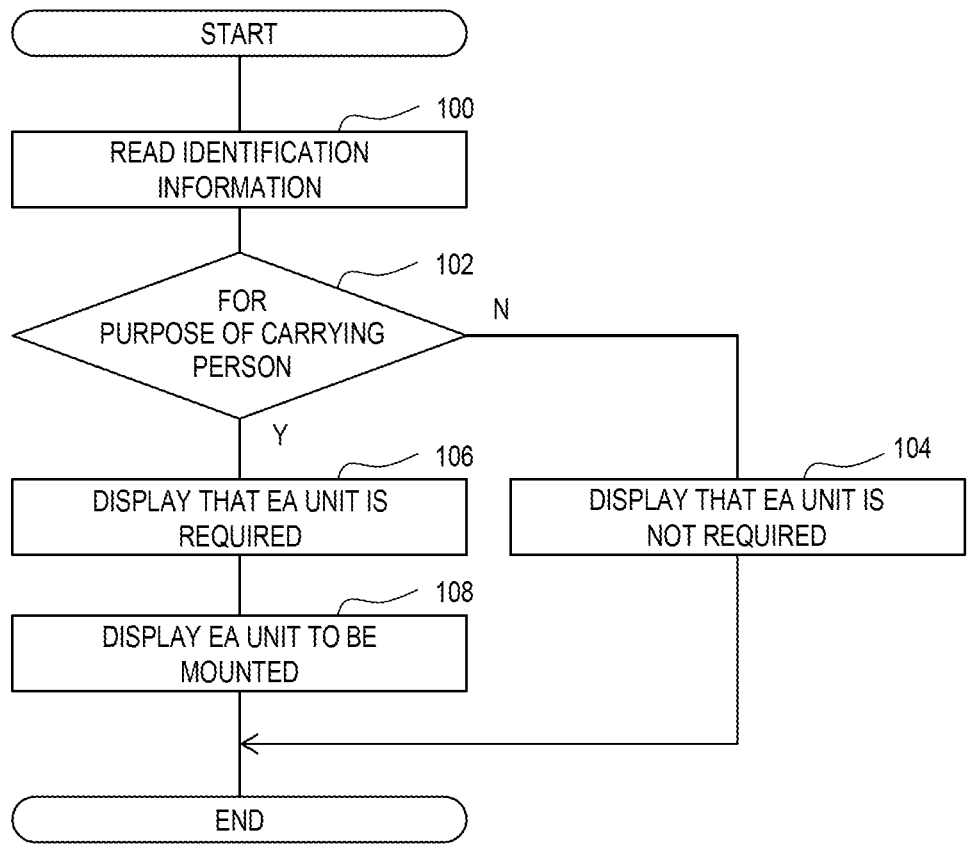
FIG. 7 is a flowchart showing one example of a flow of a vehicle unit mounting support process.

An exemplified flow of a vehicle unit mounting support process executed by the control device 32 of the traveling unit 30 will be described with reference to the flowchart of FIG. 7. The CPU 32A reads out the vehicle unit mounting support program from the ROM 32B or the storage 32D, expands the program in the RAM 32C, and executes the program to carry out the vehicle unit mounting support process.

When the vehicle cabin forming unit 20 is mounted on the upper surface side of the traveling unit 30, the CPU 32A reads out the identification information indicated by the identification unit 28 of the vehicle cabin forming unit 20 (step 100). The CPU 32A determines whether the vehicle cabin forming unit 20 is for the purpose of carrying a person based on the information read in step 100 (step 102).

In a case where it is determined that the vehicle cabin forming unit 20 is not for the purpose of carrying a person (step 102: N), the CPU 32A causes the display 36 to display the information indicating that the energy absorbing unit 40 is not required to be mounted (step 104). Consequently, a worker can easily determine that the energy absorbing unit 40 is not required. Subsequently, the CPU 32A ends the process based on the vehicle unit mounting support program.

On the other hand, in a case where it is determined that the vehicle cabin forming unit 20 is for the purpose of carrying a person (step 102: Y), the CPU 32A causes the display 36 to display the information indicating that the energy absorbing unit 40 capable of absorbing the collision energy is required to be mounted (step 106). Consequently, the worker can easily determine that the energy absorbing unit 40 is required.

The CPU 32A selects the energy absorbing unit 40 having a higher deformation load as the energy absorbing unit 40 to be mounted, as the mass measured by the mass measuring device 38 increases, and causes the display 36 to display the information on the selected energy absorbing unit 40 (step 108). Accordingly, a worker can easily select the suitable energy absorbing unit 40 according to the mass of the mounted object. When the suitable energy absorbing unit 40 is selected according to the mass of the mounted object, it is possible to prevent so-called bottoming load from occurring when the energy absorbing unit 40 is completely crushed upon the collision of the vehicle. After step 108, the CPU 32A ends the process based on the vehicle unit mounting support program.

In addition, the worker described above may be, for example, a staff member of a company that provides services for both cargo transportation and passenger transportation. In other words, for example, the worker replaces the unit mounted on the upper surface side of the traveling unit 30 such that the vehicle can serve as a high-speed ski bus in winter and a low-speed fixed-route bus or a bus for cargo transportation in other seasons. The high-speed ski bus may load heavy objects in addition to passengers if there is enough space.

Figure 8:
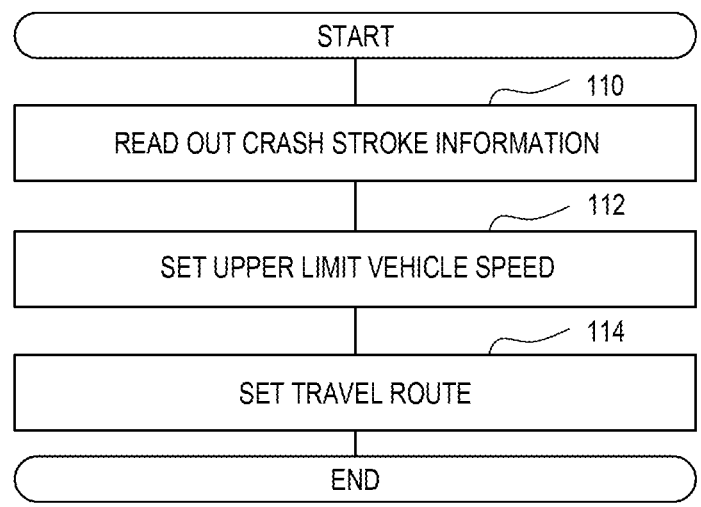
FIG. 8 is a flowchart showing one example of a flow of an upper limit vehicle speed/travel route setting process.

An exemplified flow of a upper limit vehicle speed/travel route setting process executed by the control device 22 of the vehicle cabin forming unit 20 will be described with reference to the flowchart of FIG. 8. The CPU 22A reads out a upper limit vehicle speed/travel route setting processing program from the ROM 22B or the storage 22D, expands the program in the RAM 22C, and executes the program so as to carry out the upper limit vehicle speed/travel route setting process.

When the energy absorbing unit 40 is mounted on the upper surface side of the traveling unit 30, the CPU 22A reads the crash stroke information included in the stroke information unit 42 (step 110). The CPU 22A sets the upper limit vehicle speed such that the upper limit vehicle speed increases as the crash stroke is longer based on the information read in step 110 (step 112).

The CPU 22A determines the travel route of the traveling unit 30 according to the upper limit vehicle speed set in step 112 based on information such as the destination input to the input device 29 (step 114). The CPU 22A determines the travel route of the traveling unit 30 such that it does not include a highway in a case where it is determined that the crash stroke is less than a predetermined value based on the information read in step 110. Accordingly, there is no chance of the vehicle 12 colliding on the highway, thus it is possible for the energy absorbing unit 40 to favorably absorb the collision energy even if the crash stroke is less than the predetermined value. Moreover, the CPU 22A determines the travel route of the traveling unit 30 such that it does not include, as much as possible, a road without a median strip and with a speed limit that is equal to or greater than a preset value, in a case where it is determined that the crash stroke is less than the predetermined value based on the information read in step 110.

Accordingly, the vehicle 12 is less likely to have a head-on collision with an oncoming vehicle at high speed, thus it is possible for energy absorbing unit 40 to favorably absorb the collision energy even if the crash stroke is less than the predetermined value. Subsequently, the CPU 22A ends the process based on the upper limit vehicle speed/travel route setting processing program.

A vehicle speed limiting process executed by the control device 32 of the traveling unit 30 will be described. The CPU 32A, shown in FIG. 5B, reads out the vehicle speed limiting processing program from the ROM 32B or the storage 32D, expands the program in the RAM 32C, and executes the program so as to carry out the vehicle speed limiting process.

The CPU 32A limits the vehicle speed such that the speed does not exceed the upper limit vehicle speed set in step 112 (see FIG. 8) of the upper limit vehicle speed/travel route setting process described above. Therefore, it is possible to further protect occupants upon collision, for example, without separately calculating the upper limit vehicle speed according to the crash stroke of the energy absorbing unit 40 and without manually setting the calculated upper limit vehicle speed when the unit is mounted.

Further, the CPU 32A controls the traveling unit 30 such that the traveling unit 30 does not travel, in a case where it is determined that the vehicle cabin forming unit 20 is for the purpose of carrying a person and it is not detected by the mounting detection sensor 26 that the energy absorbing unit 40 is mounted on the upper surface side of the traveling unit 30. Therefore, the impact on the occupant side due to the collision of the vehicle 12 is prevented or reduced. As a modified example, the CPU 32A controls the traveling unit 30 such that the traveling unit 30 travels at a predetermined low speed (for example, 20 km/h) or slower, in a case where it is determined that the vehicle cabin forming unit 20 is for the purpose of carrying a person and it is not detected by the mounting detection sensor 26 that the energy absorbing unit 40 is mounted on the upper surface side of the traveling unit 30. The impact on the occupant side due to the collision of the vehicle 12 is also prevented or reduced.

A route traveling control process executed by the control device 32 of the traveling unit 30 will be described. The CPU 32A, shown in FIG. 5B, reads out the route traveling control processing program from the ROM 32B or the storage 32D, expands the program in the RAM 32C, and executes the program so as to carry out the route traveling control process.

The CPU 32A controls the traveling unit 30 such that the traveling unit 30 travels along the travel route determined in step 114 (see FIG. 8) of the upper limit vehicle speed/travel route setting process described above. Accordingly, the vehicle 12 can travel along the travel route according to the upper limit vehicle speed and the crash stroke of the energy absorbing unit 40.

The vehicle 12 in which the vehicle cabin forming unit 20 and the energy absorbing unit 40 are mounted on the traveling unit 30 using the vehicle unit mounting support system 10 will be described. The vehicle 12 is an electric vehicle.

As shown in FIG. 3B, the traveling unit 30 includes a main body base 130 that supports the vehicle cabin forming unit 20 and travels. The main body base 130 is configured to include wheels 131, the traveling drive source 132 for driving the wheels 131, and a base portion 133 on which the vehicle cabin forming unit 20 is mounted. The traveling drive source 132 is a battery.

An L-shaped (as viewed from the side) front component member 135 is fixed on a front end side of the base portion 133. The front component member 135 includes a front wall portion 135A and a lower wall portion 135B extending from a lower end of the front wall portion 135A toward a vehicle rear side. The lower wall portion 135B is arranged adjacent to a front lower surface of the base portion 133, and a lower portion of the front wall portion 135A is arranged adjacent to a front end surface of the base portion 133. An upper portion and a vertical middle portion of the front wall portion 135A are arranged to face a front side of the energy absorbing unit 40.

Figure 9A:
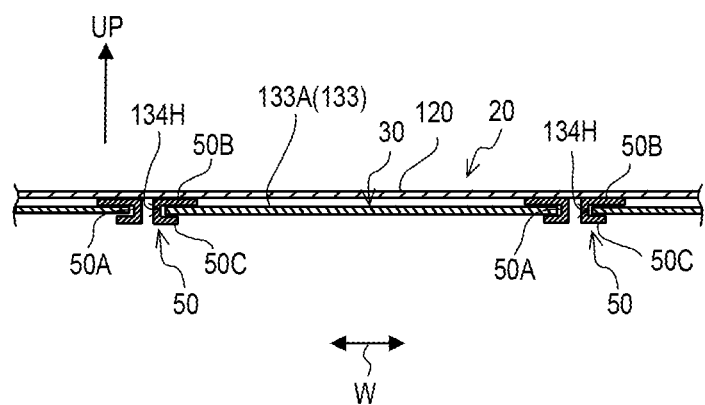
FIG. 9A is a schematic enlarged vertical cross-sectional view showing an enlarged state cut along a line 9A-9A in FIG. 3B.
Figure 9B:
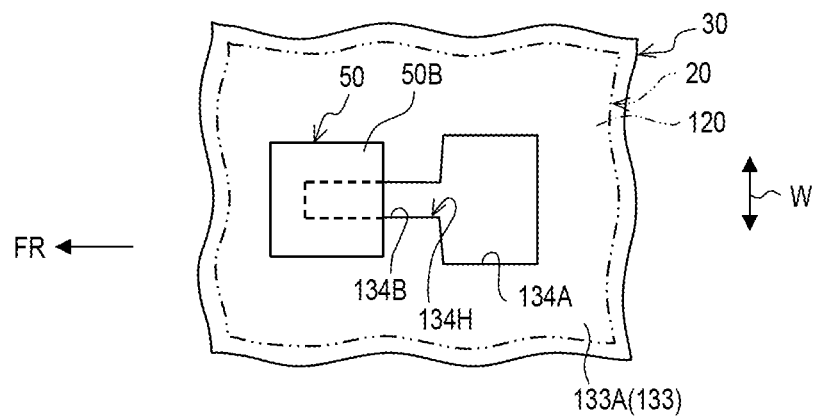
FIG. 9B is a plan view schematically showing a coupling structure portion between the traveling unit and the vehicle cabin forming unit shown in FIG. 9A as viewed from above and seen through a floor portion of the vehicle cabin forming unit.

The vehicle cabin forming unit 20 is formed in a substantially box shape, and a floor portion 120 is coupled to the traveling unit 30. FIG. 9A shows a schematic enlarged vertical cross-sectional view enlarging a state cut along line 9A-9A in FIG. 3B. Moreover, FIG. 9B shows a plan view schematically showing a coupling structure portion between the traveling unit 30 and the vehicle cabin forming unit 20 shown in FIG. 9A as viewed from above and seen through the floor portion 120 of the vehicle cabin forming unit 20. Further, FIG. 10 shows an exploded perspective view showing a state where the coupling structure portion between the traveling unit 30 and the vehicle cabin forming unit 20 is disassembled and seen through the floor portion 120 of the vehicle cabin forming unit 20.

As shown in these figures, a metal fixture 50 is welded to a lower surface of the floor portion 120 of the vehicle cabin forming unit 20. The metal fixture 50 includes a short tubular portion 50A, and has a first flange 50B extending from one axial end of the short tubular portion 50A to the radial outside of the short tubular portion 50A, and a second flange 50C extending from the other axial end of the short tubular portion 50A to the radial outside of the short tubular portion 50A. The first flange 50B is welded to the lower surface of the floor portion 120 of the vehicle cabin forming unit 20 (see FIG. 9A), and the second flange 50C is one size smaller than the first flange 50B in plan view.

Further, a through hole 134H for attaching the metal fixture 50 is formed in a top plate 133A of the base portion 133 of the traveling unit 30. The through hole 134H is formed in a substantially T-shape in plain view, and is configured by a first component portion 134A forming a rear portion of the through hole 134 and a second component portion 134B having a long-hole shape and extending from the center of a front end of the first component portion 134A in the vehicle width direction to a vehicle front side. The first component portion 134A is formed to have a size that allows the second flange 50C to pass therethrough. Further, a length of the second component portion 134B in a lateral direction is slightly larger than a diameter of the short tubular portion 50A of the metal fixture 50.

Figure 10:
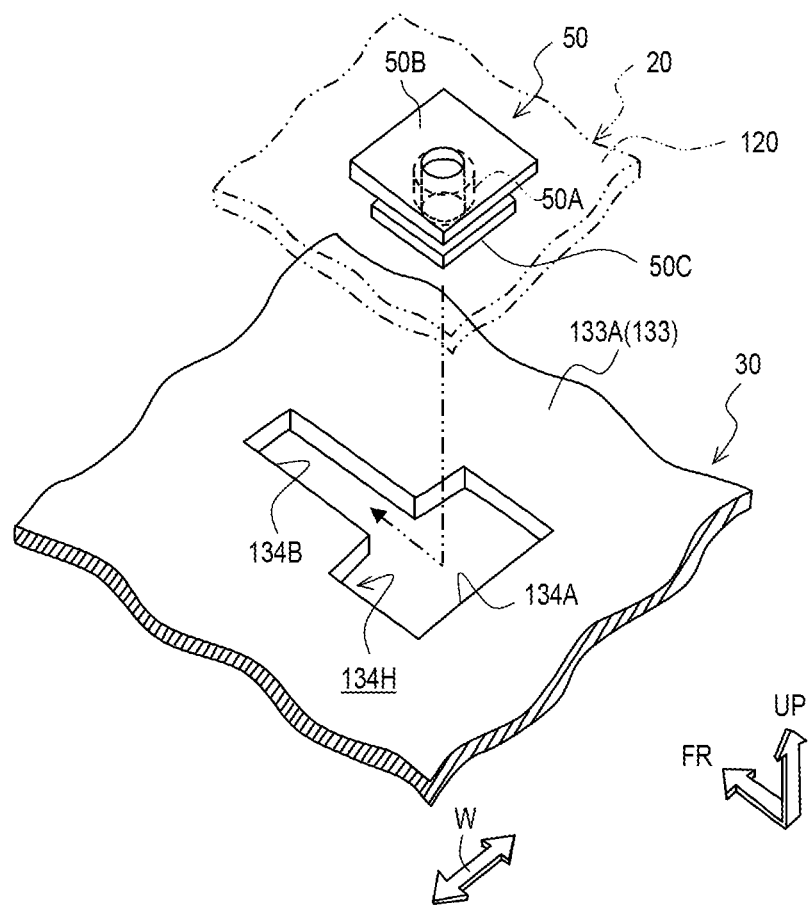
FIG. 10 is an exploded perspective view showing a state in which the coupling structure portion between the traveling unit and the vehicle cabin forming unit, shown in FIG. 9A, is disassembled and seen through the floor portion of the vehicle cabin forming unit.

When the metal fixture 50 shown in FIG. 10 is attached to the top plate 133A of the traveling unit 30, the short tubular portion 50A of the metal fixture 50 is arranged inside the first component portion 134A of the through hole 134H, and then slid toward the vehicle front side along the second component portion 134B of the through hole 134H (see an arrow indicated by a dash line) so as to abut against a front end of the second component portion 134B. Accordingly, the metal fixture 50 and the vehicle cabin forming unit 20 are positioned with respect to the traveling unit 30. The floor portion 120 of the vehicle cabin forming unit 20 is separately fastened and fixed to the top plate 133A of the traveling unit 30 by fasteners such as bolts and nuts (not shown).

On the other hand, the energy absorbing unit 40 shown in FIG. 3B includes an energy absorbing member 140 and an attachment bracket 142. The energy absorbing member 140 is arranged with a front-back direction of the vehicle as a longitudinal direction, deforms when the vehicle collides, and absorbs the collision energy. The attachment bracket 142 is formed in an L-shape when viewed from the side, and includes a vertical wall portion 142A and a lower wall portion 142B extending from a lower end of the vertical wall portion 142A toward the vehicle rear side. The lower wall portion 142B is placed on the top plate 133A of the base portion 133 of the traveling unit 30. A front end of the lower surface of the floor portion 120 of the vehicle cabin forming unit 20 includes a portion (not shown) that is set higher than general portions of the lower surface of the floor portion 120, and the lower wall portion 142B of the energy absorbing unit 40 can be inserted between such a portion and the top plate 133A of the traveling unit 30. A base end of the energy absorbing member 140 is fixed to a front surface of the vertical wall portion 142A. The energy absorbing unit 40 is configured such that the vertical wall portion 142A is detachably attached to a front wall portion 122 of the vehicle cabin forming unit 20.

Figure 11A:
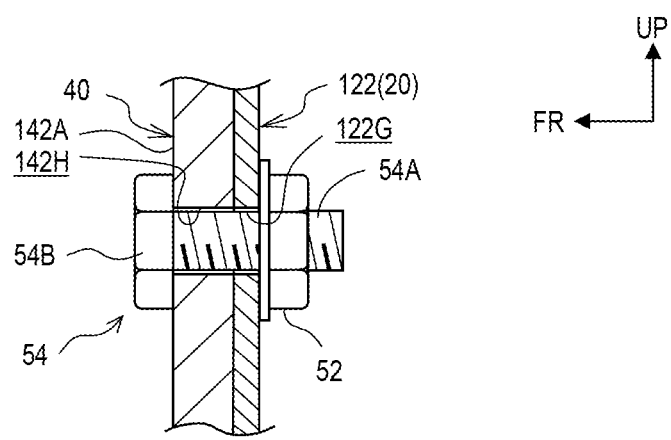
FIG. 11A is an enlarged vertical cross-sectional view showing a configuration at height positions corresponding to an upper portion and a lower portion of the energy absorbing unit at each cutting position along a line 11X-11X and a line 11Y-11Y in FIG. 3A.
Figure 11B:
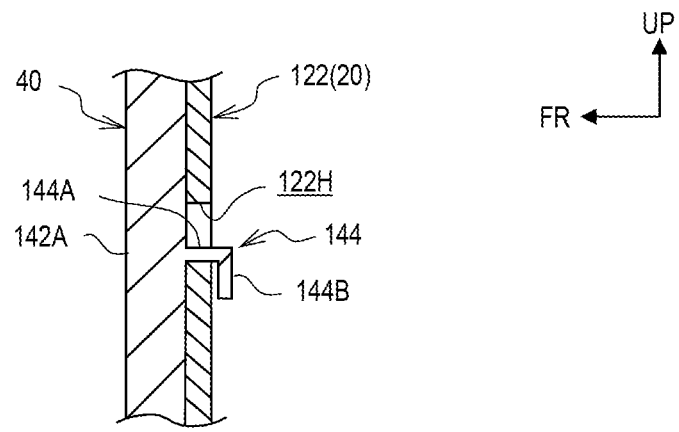
FIG. 11B is an enlarged vertical cross-sectional view showing a configuration at a height position corresponding to a vertical middle portion of the energy absorbing unit at a cutting position along the line 11X-11X and the line 11Y-11Y in FIG. 3A.

FIG. 11A shows a vertical cross-sectional view showing a configuration at height positions corresponding to an upper portion and a lower portion of the energy absorbing unit 40 at each cutting position along line 11X-11X and line 11Y-11Y in FIG. 3A. Further, FIG. 11B shows a vertical cross-sectional view showing a configuration at a height position corresponding to a vertical middle portion of the energy absorbing unit 40 at a cutting position along the line 11X-11X and the line 11Y-11Y in FIG. 3A. As shown in these figures, attachment holes 122G, 122H are formed through the front wall portion 122 of the vehicle cabin forming unit 20 at right and left sides.

As shown in FIG. 11B, a hooking portion 144 is formed in the vertical middle portion of the energy absorbing unit 40 in the vertical wall portion 142A, which is inserted into the attachment hole 122H of the front wall portion 122 of the vehicle cabin forming unit 20 to be hooked. The hooking portion 144 is formed in an L-shape when viewed from the side, and includes a lateral wall portion 144A extending toward the vehicle rear side, and a hanging wall portion 144B hanging from a lower end of the lateral wall portion 144A. The hooking portion 144 is used for positioning the energy absorbing unit 40, the lateral wall portion 144A is arranged below the attachment hole 122H, and the hanging wall portion 144B is arranged on a rear surface side of the front wall portion 122.

As shown in FIG. 11A, an attachment hole 142H is formed through the upper and lower portions of the energy absorbing unit 40 in the vertical wall portion 142A at a position corresponding to the attachment hole 122G of the front wall portion 122 of the vehicle cabin forming unit 20. Further, a weld nut 52 is fixed in advance on an outer peripheral portion of the attachment hole 122G on a rear surface of the front wall portion 122 of the vehicle cabin forming unit 20. A shaft portion 54A of a bolt 54 that penetrates from the vehicle front side the attachment hole 142H of the energy absorbing unit 40 and the attachment hole 122G of the vehicle cabin forming unit 20 is screwed into the weld nut 52. Accordingly, the vertical wall portion 142A of the energy absorbing unit 40 and the front wall portion 122 of the vehicle cabin forming unit 20 are sandwiched and tightened between a head portion 54B of the bolt 54 and the weld nut 52.

In the vehicle 12 of the present embodiment described above, it is possible to meet the demand for dealing with a collision while also the energy absorbing unit 40 can easily be mounted on the upper surface side of the traveling unit 30 shown in FIG. 3B. Further, the energy absorbing unit 40 can be removed when no one is in the vehicle cabin forming unit 20.

As a modified example of the present embodiment, the energy absorbing unit 40 may be configured to be detachably attached to at least one of the front wall portion 135A and the top plate 133A of the traveling unit 30, instead of being configured to be detachably attached to the vehicle cabin forming unit 20. In other words, the lower wall portion 142B of the energy absorbing unit 40 may be bolted to the top plate 133A of the traveling unit 30. Further, a flange portion projecting in a brim shape, for example, may be provided at the front end of the energy absorbing member 140 of the energy absorbing unit 40, which overlaps the front wall portion 135A of the traveling unit 30 to be bolted.

Additionally, a bolt similar to the bolt 54 shown in FIG. 11A and a weld nut similar to the weld nut 52 show in FIG. 11A may be employed in the modified example. As a bolt fastening structure in the modified example described above, a structure substantially similar to a bolt fastening structure shown in FIG. 11A can be employed. That is, in the configuration in which the lower wall portion 142B of the energy absorbing unit 40 is bolted to the top plate 133A of the traveling unit 30, the shaft portion of the bolt that penetrates through the attachment holes respectively formed through the lower wall portion 142B of the energy absorbing unit 40 and the top plate 133A of the traveling unit 30 is screwed into the weld nut. Further, in the configuration in which the flange portion of the energy absorbing unit 40 is bolted to the front wall portion 135A of the traveling unit 30, the shaft portion of the bolt that penetrates through the attachment holes respectively formed through the flange portion of the energy absorbing unit 40 and the front wall portion 135A of the traveling unit 30 is screwed into the weld nut.

Various variations of the vehicle 12 will be described.

Figure 12A:
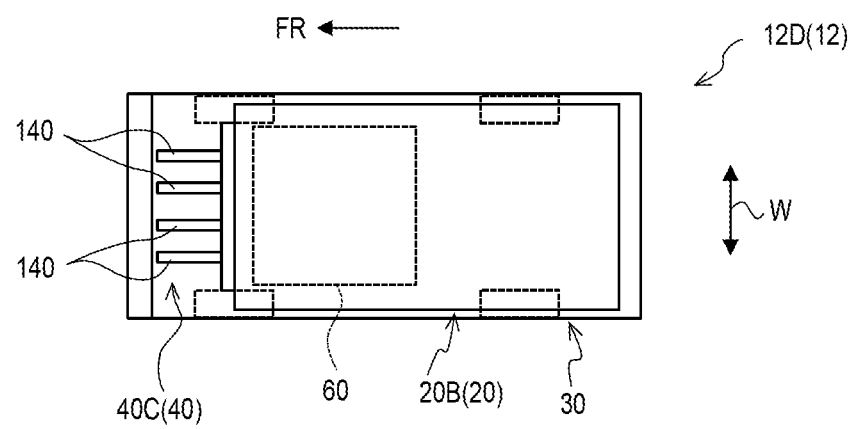
FIG. 12A is a schematic plan view of a vehicle that is for the purpose of carrying a person and load a heavy object.
Figure 12B:
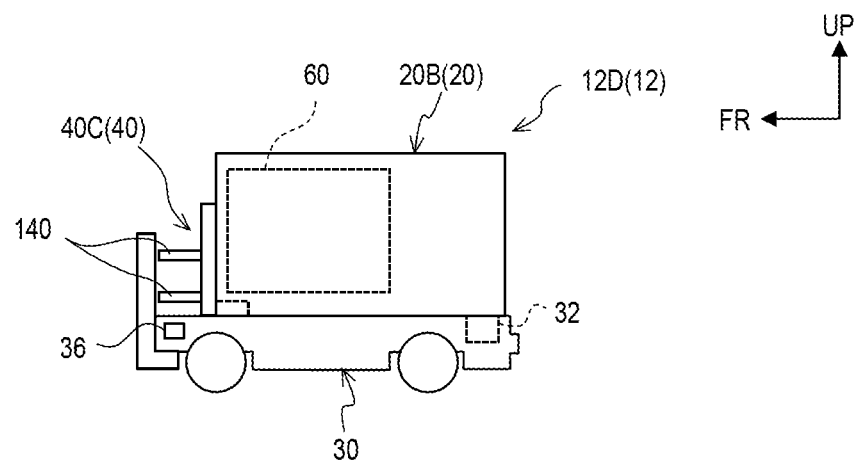
FIG. 12B is a schematic side view of the vehicle of FIG. 12A.

FIG. 12A shows a schematic plan view of a vehicle 12D that is for the purpose of carrying a person and load a heavy object 60, and FIG. 12B shows a schematic side view of the vehicle 12D. The vehicle 12D includes the energy absorption unit 40C having a higher deformation load than that of the energy absorbing unit 40A (see FIGS. 3A and 3B) described above. The energy absorbing unit 40C has a larger number of energy absorbing members 140 than that of the energy absorbing unit 40A (see FIGS. 3A and 3B).

In the vehicle 12D, the mounted object including the vehicle cabin forming unit 20B mounted on the upper surface side of the traveling unit 30 has a large mass, but the energy absorbing unit 40C having a high deformation load is employed, thus so-called bottoming load caused by the collision of the vehicle can be prevented.

Figure 13A:
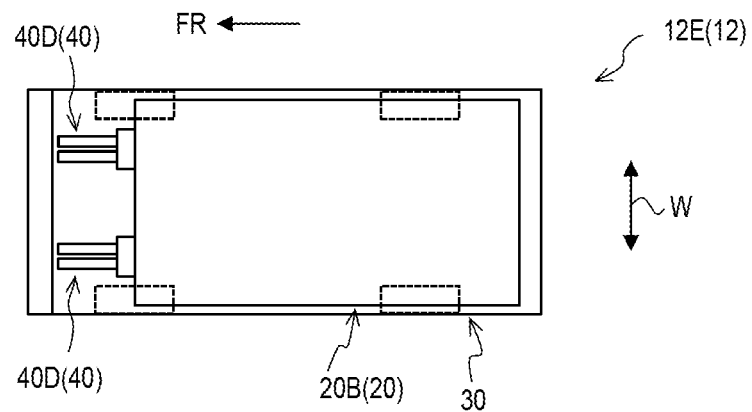
FIG. 13A is a schematic plan view showing a vehicle in which two energy absorbing units are mounted in parallel.
Figure 13B:
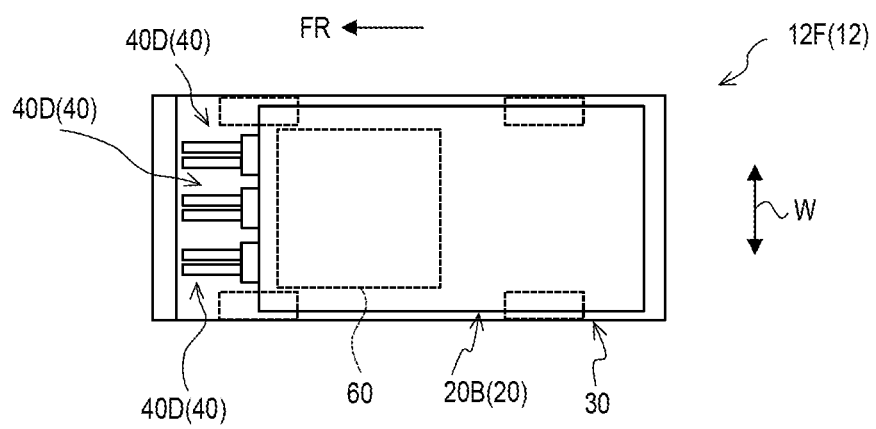
FIG. 13B is a schematic plan view showing a vehicle in which three energy absorbing units are mounted in parallel.

FIG. 13A shows a schematic plan view showing a vehicle 12E in which two energy absorbing units 40D are mounted in parallel. FIG. 13B shows a schematic plan view showing a vehicle 12F in which three energy absorbing units 40D are mounted in parallel. The deformation load upon the occurrence of a collision in the configuration shown in FIG. 13B is higher than the deformation load upon the occurrence of a collision in the configuration shown in FIG. 13A. As described above, the deformation load may be changed by mounting the plurality of energy absorbing units 40D of the same kind in parallel and changing the number of those energy absorbing units.

Figure 14:
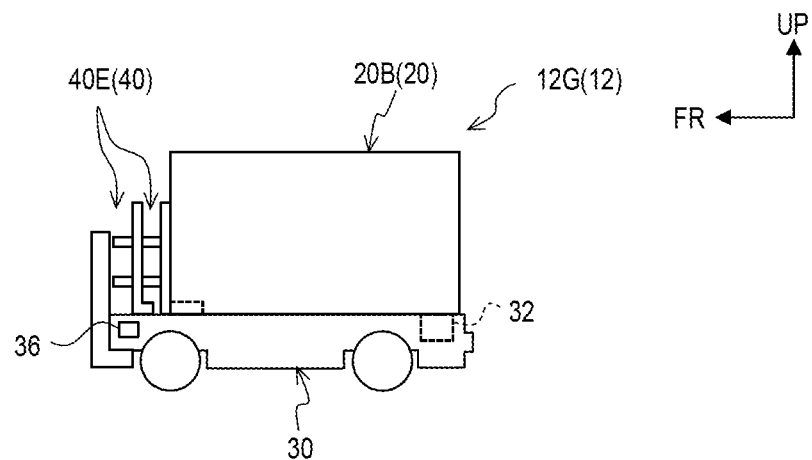
FIG. 14 is a schematic side view showing a vehicle in which two energy absorbing units are mounted in series.

FIG. 14 shows a schematic side view showing a vehicle 12G in which two energy absorbing units 40E are mounted in series. The plurality of energy absorbing units 40E of the same kind may be mounted in series. The entire crash stroke may be changed by mounting the plurality of energy absorbing units 40E in series and changing the number of those energy absorbing units.

As described above, according to the present embodiment, it is possible to meet the demand for dealing with a collision while also enhancing convenience when mounting the unit arranged above the traveling unit 30.

Various processes, executed by the CPUs 22A, 22B (shown in FIGS. 5A and 5B) reading the software (program) in each of the embodiments, may be executed by processors other than the CPU. Examples of the processor include a programmable logic device (PLD), such as a field programmable gate array (FPGA) capable of changing a circuit configuration after manufacturing, and a dedicated electrical circuit that is a processor having a circuit configuration specifically designed to execute a specific process, such as an application specific integrated circuit (ASIC). Further, each process may be executed by one of these processors, or a combination of at least two processors which are the same or different (for example, a plurality of FPGAs, or a combination of CPU and FPGA). The hardware structure of these processors is, more specifically, an electric circuit in which circuit elements, such as semiconductor elements, are combined.

The programs described in the embodiments described above may be provided in a recording medium, such as a compact disk read only memory (CD-ROM), a digital versatile disk read only memory (DVD-ROM), and a universal serial bus (USB) memory. Further, the programs may be downloaded from an external device via a network.

As modified examples of the embodiments described above, each of the reading unit, the upper limit vehicle speed setting unit, the mounting detection unit, and the route determination unit may be provided in the traveling unit.

Further, in the embodiments described above, the display unit is the display 36, but may be a voice display unit.

The following supplementary notes will be disclosed for the embodiments described above.

Note 1

Provided is a vehicle unit mounting support method, using a vehicle unit mounting support system. The vehicle unit mounting support system is used in a vehicle capable of autonomous driving. The vehicle includes a vehicle cabin forming unit configured to form a vehicle cabin, and a traveling unit configured to have at least the vehicle cabin forming unit on an upper surface side and to include a traveling drive source causing the vehicle to travel. The vehicle unit mounting support system supports a unit to be mounted on the traveling unit. The system includes an identification unit configured to be provided in the vehicle cabin forming unit and to indicate identification information on whether the vehicle cabin forming unit is for the purpose of carrying a person, a determination unit configured to be provided in the traveling unit and to determine the identification information indicated by the identification unit in a state where the vehicle cabin forming unit is mounted on the upper surface side of the traveling unit, and a display unit configured to be provided in the traveling unit and to display information. The vehicle unit mounting support method includes a step of causing the display unit to display information indicating that it is necessary to mount an energy absorbing unit configured to be capable of absorbing collision energy in a case where the determination unit determined that the vehicle cabin forming unit is for the purpose of carrying a person, and a step of causing the display unit to display information indicating that the energy absorbing unit is not required in a case where the determination unit determined that the vehicle cabin forming unit is not for the purpose of carrying a person.

Consequently, in the disclosure described in Note 1, a worker can easily determine whether the energy absorbing unit is required, similar to the disclosure described in the first aspect.

Note 2

Provided is a vehicle unit mounting support program causing a computer to execute a process. The computer is included in a vehicle unit mounting support system used in a vehicle capable of autonomous driving. The vehicle includes a vehicle cabin forming unit configured to form a vehicle cabin, and a traveling unit configured to have at least the vehicle cabin forming unit on an upper surface side and to include a traveling drive source causing the vehicle to travel. The vehicle unit mounting support system supports a unit to be mounted on the traveling unit. The system includes an identification unit configured to be provided in the vehicle cabin forming unit and to indicate identification information on whether the vehicle cabin forming unit is for the purpose of carrying a person, a determination unit configured to be provided in the traveling unit and to determine the identification information indicated by the identification unit in a state where the vehicle cabin forming unit is mounted on the upper surface side of the traveling unit, and a display unit configured to be provided in the traveling unit and to display information. The process includes a step of causing the display unit to display information indicating that it is necessary to mount an energy absorbing unit configured to be capable of absorbing collision energy in a case where the determination unit determined that the vehicle cabin forming unit is for the purpose of carrying a person, and a step of causing the display unit to display information indicating that the energy absorbing unit is not required in a case where the determination unit determined that the vehicle cabin forming unit is not for the purpose of carrying a person.

In the disclosure described in Note 2, the computer executes the vehicle unit mounting support program relating to the disclosure described in Note 2 so as to perform the vehicle unit mounting support method described in Note 1 by the computer, where a worker can easily determine whether the energy absorbing unit is required, similar to the disclosure described in the first aspect and the disclosure described in Note 1.

Although one example of the present disclosure has been described above, the present disclosure is not limited thereto, and various modifications and alterations may be made without departing from the scope thereof.

What is claimed is:

1. A vehicle unit mounting support system that supports mounting of a unit on a traveling unit in a vehicle, the vehicle including a vehicle cabin forming unit that forms a cabin of the vehicle and the traveling unit includes a traveling drive source that causes the vehicle to travel, at least the vehicle cabin forming unit on an upper surface side, and a travel central processing unit, the vehicle unit mounting support system comprising:
    an identification unit provided in the vehicle cabin forming unit and configured to indicate identification information on whether the vehicle cabin forming unit is intended to carry a person;
    a determination unit provided in the traveling unit and configured to determine the identification information indicated by the identification unit in a state where the vehicle cabin forming unit is mounted on the upper surface side of the traveling unit;
    a display provided in the traveling unit and configured to display information; and
    a display control unit provided in the traveling unit, and configured to cause, in a case where the determination unit determines that the vehicle cabin forming unit is intended to carry a person, the display to display information indicating that it is necessary to mount an energy absorbing member configured to absorb collision energy, and to cause, in a case where the determination unit determines that the vehicle cabin forming unit is not intended to carry a person, the display to display information indicating that it is not necessary to mount the energy absorbing member,
    the travel central processing unit is configured to perform the operations of the determination unit and the display control unit.

2. The vehicle unit mounting support system according to claim 1, wherein:
    the traveling unit is provided with a mass measuring device configured to measure a mass of a mounted object including the vehicle cabin forming unit mounted on the upper surface side of the traveling unit; and
    the display control unit is further configured to select, in a case where the determination unit determines that the vehicle cabin forming unit is intended to carry a person, as the energy absorbing member to be mounted, an energy absorbing member that has a higher deformation load as the mass measured by the mass measuring device increases and configured to cause the display to display information on the selected energy absorbing member.

3. The vehicle unit mounting support system according to claim 1, further comprising:

a stroke information unit provided in the energy absorbing member and configured to have crash stroke information set in the energy absorbing member;

a reading unit provided in the vehicle cabin forming unit or the traveling unit, and configured to read the crash stroke information included in the stroke information unit in a case where the energy absorbing member is mounted on the upper surface side of the traveling unit;

an upper limit vehicle speed setting unit provided in the vehicle cabin forming unit or the traveling unit, and configured to set an upper limit speed of the vehicle such that the upper limit speed increases as a crash stroke is longer based on the information read by the reading unit; and a vehicle speed limiting unit provided in the traveling unit and configured to limit a speed of the vehicle such that the speed does not exceed the upper limit speed set by the upper limit vehicle speed setting unit, wherein the vehicle cabin forming unit further comprises a vehicle central processing unit configured to perform the operations of the reading unit and the upper limit vehicle speed setting unit, and wherein the travel central processing unit is configured to perform the operations of the vehicle speed limiting unit.

4. The vehicle unit mounting support system according to claim 3, wherein:

the vehicle cabin forming unit or the traveling unit is provided with a mounting detection sensor configured to detect mounting of the energy absorbing member on the upper surface side of the traveling unit; and the vehicle speed limiting unit is further configured to control the traveling unit such that the traveling unit does not travel or travels at a predetermined speed or slower, in a case where the determination unit determines that the vehicle cabin forming unit is intended to carry a person and the mounting detection sensor does not detect mounting of the energy absorbing member on the upper surface side of the traveling unit.

5. The vehicle unit mounting support system according to claim 3, further comprising:

a route determination unit provided in the vehicle cabin forming unit or the traveling unit, and configured to determine a travel route of the traveling unit according to the upper limit speed set by the upper limit vehicle speed setting unit; and a route traveling control unit provided in the traveling unit and configured to control the traveling unit such that the traveling unit travels along the travel route determined by the route determination unit, wherein the vehicle central processing unit is configured to perform the operations of the route determination unit, and wherein the travel central processing unit is configured to perform the operations of the route traveling control unit.

6. The vehicle unit mounting support system according to claim 5, wherein the route determination unit is configured to determine the travel route of the traveling unit such that the travel route does not include a highway in a case where it is determined that the crash stroke is less than a predetermined value based on the information read by the reading unit.

7. The vehicle unit mounting support system according to claim 5, wherein the route determination unit is configured to determine the travel route of the traveling unit such that the travel route does not include, as much as possible, a road without a median strip and with a speed limit that is equal to or greater than a preset value in the travel route of the traveling unit, in a case where it is determined that the crash stroke is less than a predetermined value based on the information read by the reading unit.

8. The vehicle unit mounting support system according to claim 3, wherein the stroke information unit is one of an IC tag or a barcode.

9. The vehicle unit mounting support system according to claim 1, further comprising:

a mounting detection sensor provided in the vehicle cabin forming unit or the traveling unit and configured to detect mounting the energy absorbing member on the upper surface side of the traveling unit; and a vehicle speed limiting unit provided in the traveling unit, and configured to control the traveling unit such that the traveling unit does not travel or travels at a predetermined speed or slower, in a case where the determination unit determines that the vehicle cabin forming unit is intended to carry a person and the mounting detection sensor does not detect mounting of the energy absorbing member on the upper surface side of the traveling unit, wherein the travel central processing unit is configured to perform the operations of the vehicle speed limiting unit.

10. The vehicle unit mounting support system according to claim 1, wherein the identification unit is an IC tag.

11. The vehicle unit mounting support system according to claim 1, wherein the identification unit is a barcode.

12. An autonomous vehicle comprising:

a traveling unit including a traveling drive source that causes the vehicle to travel;

a vehicle cabin forming unit mounted on an upper surface side of the traveling unit and configured to form a cabin of the vehicle;

an attachment bracket detachably attached to a front wall portion of the vehicle cabin forming unit, the attachment bracket is formed in an L-shape when viewed from a side, the attachment bracket includes a vertical wall portion and a lower wall portion extending from a lower end of the vertical wall portion toward a vehicle rear side, the lower wall portion is placed on the traveling unit, the vertical wall portion is detachably attached to the front wall portion of the vehicle cabin forming unit; and an energy absorbing member configured to absorb collision energy, the energy absorbing member being fixed to the attachment bracket so as to be detachably attached to the vehicle cabin forming unit, and in between the traveling unit and the vehicle cabin forming unit.

13. The vehicle according to claim 12, further comprising:

a stroke information unit provided in the energy absorbing member and configured to have crash stroke information set in the energy absorbing member;

a reading unit provided in the vehicle cabin forming unit or the traveling unit, and configured to read the crash stroke information included in the stroke information unit in a case where the energy absorbing member is mounted on the upper surface side of the traveling unit;

an upper limit vehicle speed setting unit provided in the vehicle cabin forming unit or the traveling unit, and configured to set an upper limit speed of the vehicle such that the upper limit speed increases as a crash stroke is longer, based on the information read by the reading unit; and a vehicle speed limiting unit provided in the traveling unit and configured to limit a speed of the vehicle such that the speed does not exceed the upper limit speed set by the upper limit vehicle speed setting unit, wherein the traveling unit further comprises a travel central processing unit configured to perform the operations of the vehicle speed limiting unit wherein the vehicle cabin forming unit further comprises a vehicle central processing unit configured to perform the operations of the reading unit and the upper limit vehicle speed setting unit.

14. The vehicle according to claim 13, further comprising:

a route determination unit provided in the vehicle cabin forming unit or the traveling unit, and configured to determine a travel route of the traveling unit according to the upper limit speed set by the upper limit vehicle speed setting unit; and a route traveling control unit provided in the traveling unit and configured to control the traveling unit such that the traveling unit travels along the travel route determined by the route determination unit, wherein the traveling unit further comprises a travel central processing unit configured to perform the operations of the route traveling control unit, and wherein the vehicle cabin forming unit further comprises a vehicle central processing unit configured to perform the operations of the route determination unit.

15. The vehicle according to claim 14, wherein the route determination unit is configured to determine the travel route of the traveling unit such that the travel route does not include a highway in a case where it is determined that the crash stroke is less than a predetermined value based on the information read by the reading unit.

16. The vehicle according to claim 14, wherein the route determination unit is configured to determine the travel route of the traveling unit such that the travel route does not include, as much as possible, a road without a median strip and with a speed limit that is equal to or greater than a preset value in the travel route of the traveling unit, in a case where it is determined that the crash stroke is less than a predetermined value based on the information read by the reading unit.

17. The vehicle according to claim 13, wherein the stroke information unit is an IC tag.

18. The vehicle according to claim 13, wherein the stroke information unit is a barcode.

19. An autonomous vehicle comprising:

a traveling unit including a traveling drive source that causes the vehicle to travel;

a vehicle cabin forming unit mounted on an upper surface side of the traveling unit and configured to form a cabin of the vehicle;

an energy absorbing member mounted on the upper surface side of the traveling unit, detachably attached to the vehicle cabin forming unit or the traveling unit, and in between the traveling unit and the vehicle cabin forming unit, and configured to absorb collision energy;

a stroke information unit provided in the energy absorbing member and configured to have crash stroke information set in the energy absorbing member;

a reading unit provided in the vehicle cabin forming unit or the traveling unit, and configured to read the crash stroke information included in the stroke information unit in a case where the energy absorbing member is mounted on the upper surface side of the traveling unit;

an upper limit vehicle speed setting unit provided in the vehicle cabin forming unit or the traveling unit, and configured to set an upper limit speed of the vehicle such that the upper limit speed increases as a crash stroke is longer, based on the information read by the reading unit; and a vehicle speed limiting unit provided in the traveling unit and configured to limit a speed of the vehicle such that the speed does not exceed the upper limit speed set by the upper limit vehicle speed setting unit, wherein the traveling unit further comprises a travel central processing unit configured to perform the operations of the vehicle speed limiting unit wherein the vehicle cabin forming unit further comprises a vehicle central processing unit configured to perform the operations of the reading unit and the upper limit vehicle speed setting unit.

20. The vehicle according to claim 19, wherein the stroke information unit is one of an IC tag or a barcode.

* * * * *